United States Patent
Setterholm

(10) Patent No.: US 7,233,691 B2
(45) Date of Patent: Jun. 19, 2007

(54) ANY ASPECT PASSIVE VOLUMETRIC IMAGE PROCESSING METHOD

(75) Inventor: Jeffrey M. Setterholm, Lakeville, MN (US)

(73) Assignee: Geospan Corporation, Maple Grove, MN (US)

(*) Notice: Subject to any disclaimer, the term of this patent is extended or adjusted under 35 U.S.C. 154(b) by 697 days.

(21) Appl. No.: 10/168,811

(22) PCT Filed: Dec. 29, 2000

(86) PCT No.: PCT/US00/35591

§ 371 (c)(1),
(2), (4) Date: Jun. 20, 2002

(87) PCT Pub. No.: WO01/48683

PCT Pub. Date: Jul. 5, 2001

(65) Prior Publication Data

US 2002/0191838 A1    Dec. 19, 2002

Related U.S. Application Data

(60) Provisional application No. 60/173,440, filed on Dec. 29, 1999.

(51) Int. Cl.
*G06K 9/00* (2006.01)
*G06K 9/32* (2006.01)
(52) U.S. Cl. ...................... 382/154; 382/293
(58) Field of Classification Search ............... 382/154, 382/293
See application file for complete search history.

(56) References Cited

U.S. PATENT DOCUMENTS

| 4,754,327 | A |   | 6/1988  | Lippert ................. 358/88    |
| 5,446,798 | A | * | 8/1995  | Morita et al. ............ 382/154 |
| 5,602,584 | A | * | 2/1997  | Mitsutake et al. ......... 348/47  |
| 5,633,946 | A |   | 5/1997  | Lachinski et al.                   |
| 5,644,651 | A |   | 7/1997  | Cox et al.                         |
| 5,655,033 | A |   | 8/1997  | Inoguchi et al.                    |
| 5,680,474 | A |   | 10/1997 | Iijima et al.                      |
| 5,703,961 | A |   | 12/1997 | Rogina et al.                      |
| 5,937,015 | A |   | 8/1999  | Dent et al.                        |
| 5,937,079 | A |   | 8/1999  | Franke                             |
| 5,963,247 | A |   | 10/1999 | Banitt                             |
| 6,011,863 | A |   | 1/2000  | Roy                                |
| 6,064,760 | A |   | 5/2000  | Brown                              |
| 6,078,701 | A |   | 6/2000  | Hsu et al.                         |
| 6,084,979 | A |   | 7/2000  | Kanade et al.                      |
| 6,157,747 | A |   | 12/2000 | Szeliski et al.                    |

OTHER PUBLICATIONS

Sebastien Roy, Jean Meunier, and Ingemar J. Cox, Cylindrical Rectification to Minimize Epipolar Distortion, Computer Vision and Pattern Recognition 1997, pp. 393-399.
M. Pollefeys, R. Koch, M. Vergauwen and L. Van Gool, Hand-held acquisition of 3D models wilth a video camera, 1999, pp. 14-23.

* cited by examiner

*Primary Examiner*—Matthew C. Bella
*Assistant Examiner*—Wes Tucker
(74) *Attorney, Agent, or Firm*—Kinney & Lange, P.A.

(57) ABSTRACT

Recorded images having an overlapping scene transformed into a Quantitative Cylispheric Stereo Pair (QCSP) of images. Pixels corresponding to a common scene object point are located in the same or nearly the same horizontal lines in the QCSP of images. The QCSP's produced can take a number of different formats, including traditional stereo pairs, radial stereo pairs, and general case cylispheric stereo pairs. The QCSP's can be used for various three-dimensional imaging processes, including passive volumetric surveying and the production of three-dimensional visualization models.

24 Claims, 10 Drawing Sheets

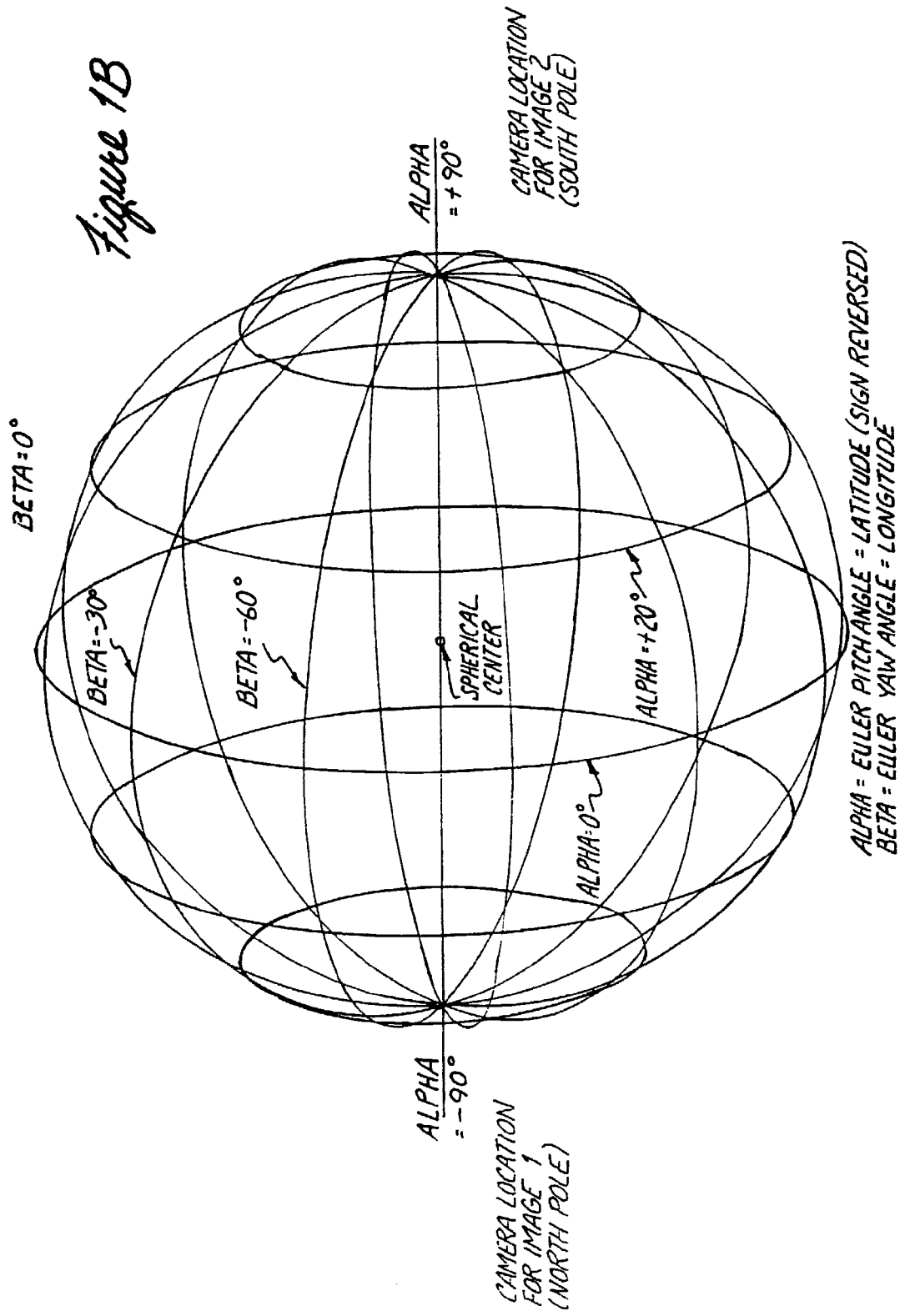

$$[\text{EULER}] = \begin{bmatrix} \cos\Psi & -\sin\Psi & 0 \\ \sin\Psi & \cos\Psi & 0 \\ 0 & 0 & 1 \end{bmatrix} \begin{bmatrix} \cos\Theta & 0 & \sin\Theta \\ 0 & 1 & 0 \\ -\sin\Theta & 0 & \cos\Theta \end{bmatrix} \begin{bmatrix} 1 & 0 & 0 \\ 0 & \cos\Phi & -\sin\Phi \\ 0 & \sin\Phi & \cos\Phi \end{bmatrix}$$

YAW — PITCH — ROLL

OUTPUT ← YAW ← PITCH ← ROLL ← INPUT
(OUTER GIMBAL) (MIDDLE GIMBAL) (INNER GIMBAL)

$$[\text{EULER}] = \begin{bmatrix} (\cos\Psi \cos\Theta) & (\cos\Psi \sin\Theta \sin\Phi - \sin\Psi \cos\Phi) & (\cos\Psi \sin\Theta \cos\Phi + \sin\Psi \sin\Phi) \\ (\sin\Psi \cos\Theta) & (\sin\Psi \sin\Theta \sin\Phi + \cos\Psi \cos\Phi) & (\sin\Psi \sin\Theta \cos\Phi - \cos\Psi \sin\Phi) \\ (-\sin\Theta) & (\cos\Theta \sin\Phi) & (\cos\Theta \cos\Phi) \end{bmatrix}$$

ANOTHER IMPORTANT FACT:
$[\text{EULER}]^{-1} = [\text{EULER}]^T$

ANY ASPECT PASSIVE VOLUMETRIC IMAGE PROCESSING METHOD

CROSS-REFERENCE TO RELATED APPLICATION(S)

This application claims priority from Provisional Patent Application Ser. No. 60/173,440 filed on Dec. 29, 1999, for "Passive Volume Surveying From Synthetic Quantitative Stereo Pair Images" by Jeffrey M. Setterholm.

BACKGROUND OF THE INVENTION

The present invention relates to surveying from recorded images, and more particularly to passive volumetric surveying from pseudo or synthetic stereo images. Thorough understanding, precise measuring, and concise parameterization of the influences of geometric effects on the content of images results in being able to use a compact set of equations to separate the complexities of image geometry from the problem of image correlation—thus paving the way for considerably more efficient automatic image correlation as is the case with traditional coplanar stereo imagery. That, in turn, allow the efficient generation of detailed three dimensional virtual models of the real world as can be seen from the multiple arbitrary viewpoints provided by oblique imagery.

Surveying involves determining the geographic location of points or objects that appear in an image, such as a video image. The images used in surveying may be obtained in any one of a variety of ways. Examples include images taken from a helicopter and images taken from a moving vehicle. A method for obtaining video image data from a moving vehicle is disclosed in commonly assigned U.S. Pat. No. 5,633,946, entitled "METHOD AND APPARATUS FOR COLLECTING AND PROCESSING VISUAL AND SPATIAL POSITION INFORMATION FROM A MOVING PLATFORM" (the '946 patent), which is hereby incorporated by reference. The '946 patent discloses a vehicle with multiple video cameras mounted thereon at different orientations. The vehicle is driven along a street and video images from each of the video cameras are recorded. Each image frame has a time code associated therewith. Accurate spatial position data is also obtained and recorded along with associated time codes. The spatial position data is obtained from a global positioning system (GPS) and an inertial navigation system (INS). The GPS system includes a GPS receiver in the vehicle and a GPS base receiver located in a known position. Errors introduced into the GPS satellite information are eliminated through differential processing of the GPS data gathered by the GPS receiver in the vehicle and the GPS base receiver. The INS comprises a set of rotation and acceleration sensors, and continually measures changes in rotation and changes in velocity as the vehicle moves in latitude, longitude, elevation, pitch, roll and yaw. The INS, therefore, provides raw differential spatial position data with six degrees of freedom between points where precise positional readings are taken by the GPS system.

In post-processing of the above navigation data, Kalman filtering techniques are used to compute a six-degree-of-freedom trajectory for the van as a function of time. This resulting trajectory is a best-fit through all of the navigation data. The indexing of the vehicle's six-dimensional spatial position data by time code allows it to be correlated with each recorded video image, which is also indexed by time code.

For each camera, camera calibration data is also generated and stored for later use in the surveying process. The camera calibration data is intended to adequately represent both the internal optical geometry of the camera and the external six-dimensional location of the camera in the vehicle. The internal aspects relate image pixels with associated rays in camera coordinates. The external aspects relate rays defined in camera coordinates with rays in global coordinates. Both these aspects operate bi-directionally. After both vehicle navigation data post-processing and camera calibration have been completed, a six-dimensional global location can be assigned to each video frame. The combination of the spatial data and the camera calibration data is referred to herein as the image parameters for each frame. After the image parameters have been determined, an image is ready to be used for surveying. Two or more such images at different locations, which view the same object or objects of interest, are used to accomplish the surveying.

Traditionally, aerial surveying has been done using a stereo photogrammetric approach. The mathematics of traditional stereo photography are based on the assumption the source images were taken in approximately the same geometric plane with correction terms for minor deviations of image location from the coplanar assumption. Such an approach must compensate for a relatively short baseline between two cameras by using high resolution digital cameras, which require extraordinarily large amounts of data to be stored. Further, when computing the position of a point or an object which is a great distance from the cameras, as must often be done in the stereo photogrammetric approach, the potential for error in calculating the position of the object is greatly increased.

One objective of the '946 patent is to determine the location of objects seen in two or more images using a generalized approach to surveying in which the locations of objects within images are determined from any two or more images having an overlapping scene, regardless of interimage geometry. It would be desirable to systematically apply this concept to the overlapping pixels of entire images without regard to interimage geometry. However, a difficulty that arises with a plurality of non-coplanar images is that the images are not easily correlated. Correlation algorithms must search through large portions of image data to find pixels in one image that correspond to pixels in the second image. It is commonly known that correlation processes to operate more efficiently on stereo pairs images. For example, in a human-viewable stereo pair, the same object-point in the left and right images lies on the same horizontal line in both images; the difference in lateral displacement along the horizontal line varies with distance of the object-point from the co-plane of the images.

BRIEF SUMMARY OF THE INVENTION

While human viewing of stereo pairs is qualitative, it is also desirable to have definitive quantitative knowledge of the depth information implicit in a stereo pair. Furthermore, automatic algorithms, not constrained by human physiology can operate on a broader class of such stereo pairs. We refer to this broader class of transformed images as Quantitative Cylispheric Stereo Pairs (QCSP'-s). QCSP'-s preserve the line registration of corresponding pixels.

In the present invention, recorded images having an overlapping scene are transformed using a geometric transformation, into QCSPs. The QCSPs can take a number of different formats, such as traditional human-viewable stereo pairs, radial stereo pairs, and general case quantitative cylispheric stereo pairs. The QCSPs can be used for various three-dimensional imaging processes, such as passive volumetric surveying and production of three-dimensional visualization models.

BRIEF DESCRIPTION OF THE DRAWINGS

FIG. 1B illustrates how the two spheres of FIG. 1A can be represented as a common sphere with an infinite radius and a single coordinate system.

FIG. 7 illustrates Euler transformations.

DETAILED DESCRIPTION

I. Generation of Quantitative Cylispheric Stereo Pairs (QCSP'-s).

The first step in the surveying process is to collect image data, spatial position data and camera calibration data. After this data has been collected, two images having an overlapping scene are identified. The two identified images can come from different cameras or can be from the same camera at different points in time. The two images need not be coplanar. Each of the two identified source images is transformed into a transformed or destination image. The transformation is referred to as a "cylispheric" transformation because both cylindrical and spherical mathematical constructs are used to transform the images. The two transformed images comprise a QCSP, in that if a particular point is seen in both source images, then the point will lie on the same line in both of the transformed images. The cylispheric transform and its general case output will be described first. Quantitative radial and traditional stereo pairs are alternative output formats of the cylispheric transformation.

The cylispheric transform is most useful in the presence of accurate image parameters. Errors in the image parameters will cause the pixel associated with an object-point to have incorrect horizontal and/or vertical offsets in where the pixel is placed in the transformed image; thus, errors tend to force widening of the correlation window and hence waste computation time. The more accurate the image parameters are, the more narrow the search will be for corresponding pixels between images. In other words, with very accurate image parameters, corresponding pixels will be found in the same line of the transformed images. With less accurate positional information, corresponding pixels will be found within a few lines or more.

In what follows, "camera location" refers to where a camera was, in six-dimensional space, when a particular image was taken. The "image parameters" of each image include this information.

Figure 1A:
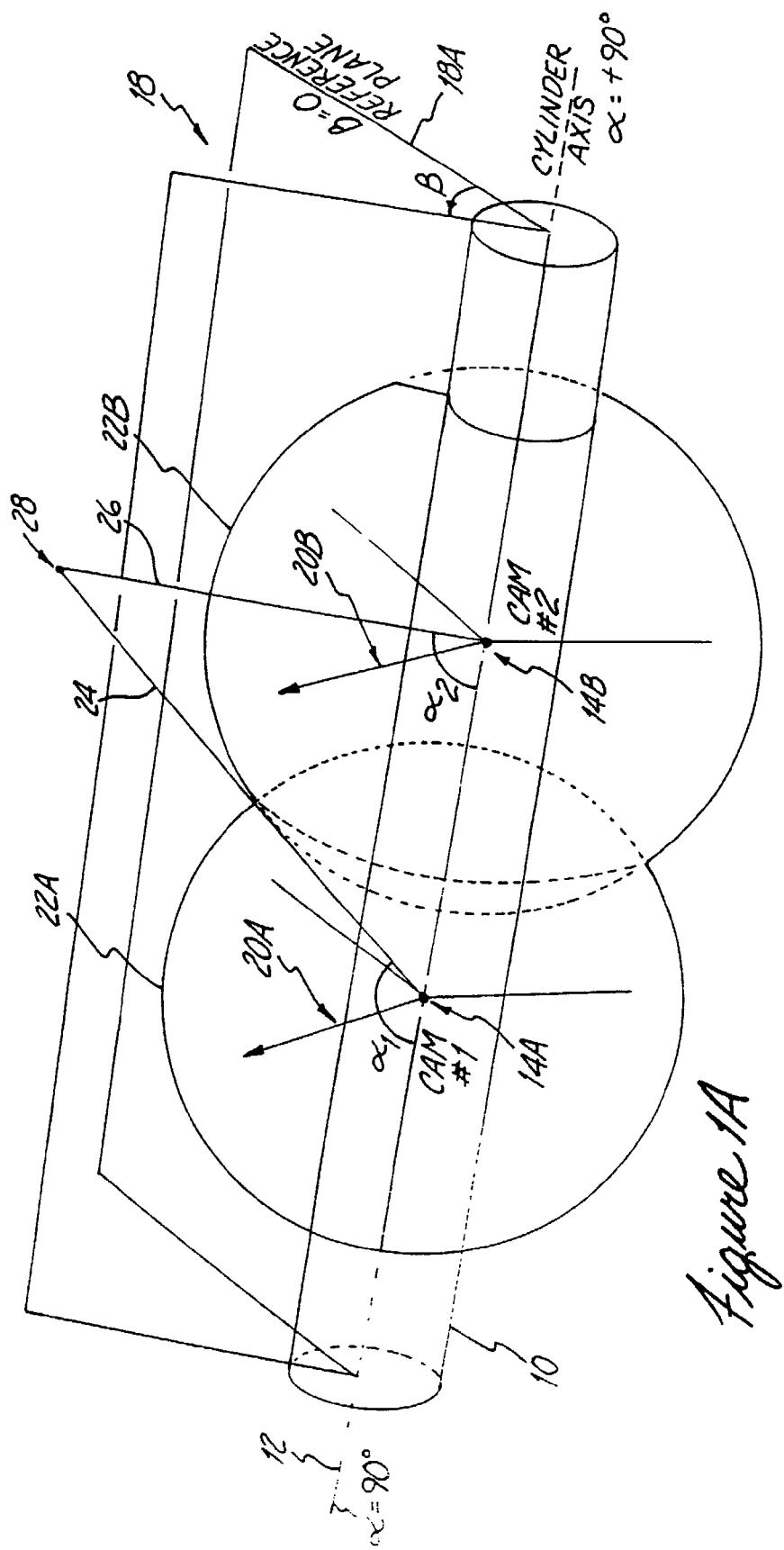
FIG. 1A graphically illustrates the mathematical constructs used in the cylispheric transformation of the present invention.

FIG. 1A graphically illustrates the mathematical constructs used in the cylispheric transformation. Two camera locations are shown in FIG. 1A—first camera location 14A and second camera location 14B. The direction of camera one is represented by axis 20A and the direction of camera two is represented by axis 20B. Camera two may actually be the same camera as camera one, but at a different location at another point in time. A cylinder 10 with axis 12, which passes through camera locations 14A and 14B, defines a 360 degree fan of planes 18. Each one of planes 18 intersects axis 12 of cylinder 10. An angle "beta" is assigned to the angular rotation of each one of planes 18 with respect to a reference plane 18A. Some, if not all, of planes 18 pass through the field of view of each of the two source images. If a plane is in view, it will be in view as a line because the plane is seen edge-on. Pixel correspondences between one image and another occur along the same line. These lines define the horizontal lines (i.e., rows) of the output image.

A first sphere 22A is centered at first camera location 14A and a second sphere 22B is centered at second camera location 14B. The angle between cylinder axis 12 and any vector originating at the origin of the sphere 22 is called "alpha". In FIG. 1A, a first vector 24 is drawn from first camera location 14A to a point in space 28, and a second vector 26 is drawn from second camera location 14B to the same point 28. Alpha 1 ($\alpha 1$) represents the alpha value for first vector 24, and Alpha 2 ($\alpha_2$) represents the alpha value for second vector 26. Any point in space has two alpha values and one beta value. Lines of constant alpha define the vertical lines (i.e., columns) of the QCSP image.

There is no explicit length associated with the (alpha, beta) coordinate pair. Thus, spheres 22A and 22B of FIG. 1A can also be thought of as a common sphere with an infinite radius and a single (alpha, beta) coordinate system as shown in FIG. 1B.

The net result of the cylispheric transformation is that each camera location 14A and 14B is enclosed in a globe-like grid with: (1) the polar axis aligned with the cylinder axis, (2) longitude lines corresponding to rows of the output image, and (3) latitude lines corresponding to columns of the output image. The projection of the source image onto this grid illustrates where the image will plot in the output image. The cylispheric transformation does not involve any translation operations, only rotation operations. The transform is anchored to the displacement vector between the two camera locations. Thus, no parallax errors are introduced by the transformation.

Figure 2:
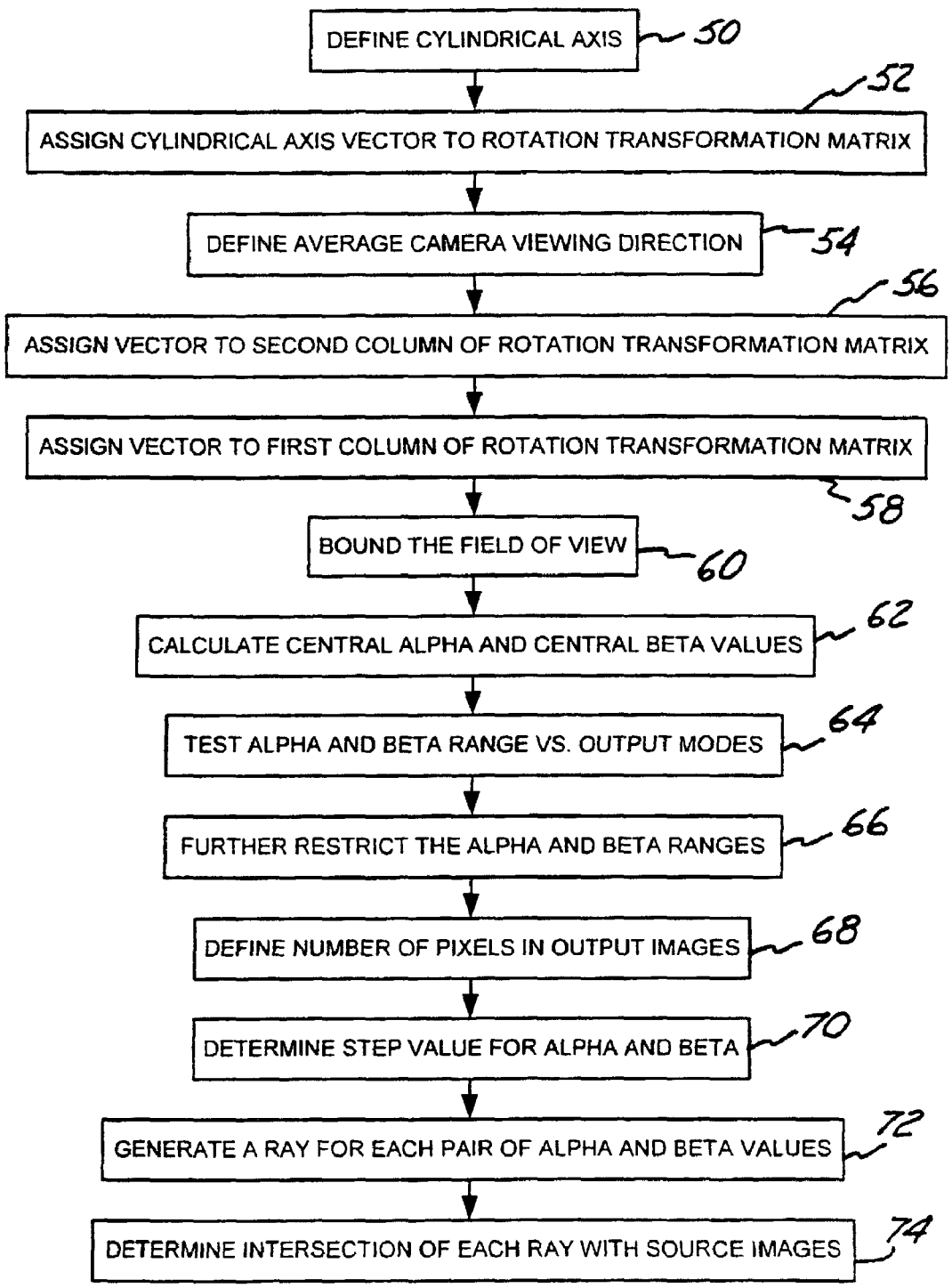
FIG. 2 shows a flow diagram of the cylispheric transformation of the present invention.
Figure 6:
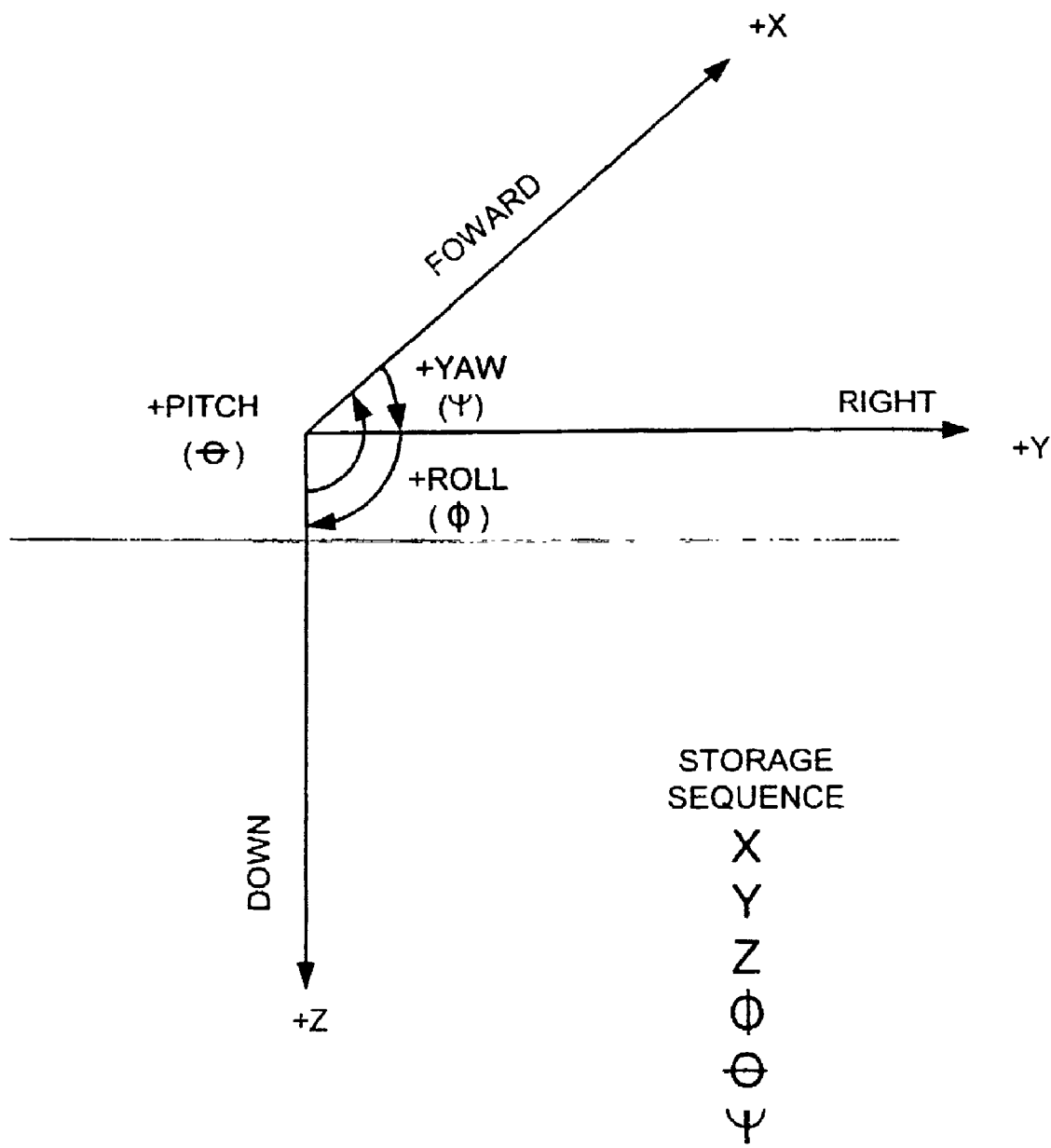
FIG. 6 is a diagram illustrating flight simulation coordinates.

FIG. 2 shows a flow diagram of the cylispheric transformation of the present invention. The first step in the process is to define the cylindrical axis 12. (Block 50). A vector is drawn from the second camera location 14B to the first camera location 14A. The camera locations 14 are determined from the stored image parameter data. The stored image parameter data includes, for each image, translation data in ITRF earth-centered, earth-fixed (ECEF) global coordinates, rotation data (roll, pitch and yaw) in standard aircraft coordinate format, (See FIG. 6) and a 3×3 Euler matrix (i.e., direction cosine matrix) that is calculated based on the rotation data.(See FIG. 7)

The cylindrical axis vector is normalized to generate a unit vector. The cylindrical axis unit vector is then assigned to the third column of a 3×3 rotation transformation matrix. (Block 52).

The next step in the transform is to define the average camera viewing direction. (Block 54). The average camera viewing direction is calculated by summing the first column of the direction cosine matrix associated with the first image (which is, roughly speaking, the direction of the outward optical axis of the first camera) with the first column of the direction cosine matrix associated with the second image (which is, roughly speaking, the direction of the outward optical axis of the second camera), and normalizing the resulting vector.

Next, a vector is assigned to the second column of the rotation transformation matrix (Block 56); this vector is both perpendicular to the cylinder axis and perpendicular to the average viewing direction. The vector that is assigned to the third column of the rotation transformation matrix is the vector that results from the cross product of the normalized cylindrical axis vector and the normalized average viewing direction vector. The resulting vector is normalized prior to assignment to the third column of the rotation transformation matrix.

If the average viewing direction is close to the cylindrical axis, it may be preferable to use an "up" or "down" vector in place of the average viewing direction. In addition, if the cylindrical axis is vertical, it may be preferable to use a "north" vector in place of the average viewing direction.

The rotation transformation matrix is completed by assigning a vector to the first column of that matrix. (Block 58). The vector assigned to the first column of the matrix is the vector that results from the cross product of the second column of the matrix and the third column of the matrix. The completed rotation transformation matrix is used in rotating vectors expressed in global ECEF coordinates to local cylispheric X, Y and Z coordinates. Alpha and beta values may then be calculated from the cylispheric X, Y and Z coordinates.

In the following paragraphs, a "ray" is a vector which originates from a specific point and extends in only one direction (i.e., a ray is a directed line segment).

After the rotation transformation matrix is completed, the field of view for the transformed images is determined. (Block 60). Determination of the field of view involves identifying the minimum and maximum values of alpha and beta. A preferred method for identifying minimum and maximum values of alpha and beta is to choose a subset of pixels in each source image. An 11×11 grid of pixels, which includes the edges of the image has been found to be satisfactory (thus testing 121 pixels). For each pixel, a corresponding ray is generated that extends outward from the camera location. The ray is expressed in global ECEF coordinates. An alpha and beta value are calculated for each ray. In calculating the alpha and beta values that correspond to a ray, the global coordinates of the ray are transformed to cylispheric X, Y and Z coordinates using the rotation transformation matrix. The alpha and beta values are then determined from the cylispheric X, Y and Z coordinates. The alpha and beta values are compared to one another to identify the minimum and maximum values.

Central alpha and central beta values are calculated from the minimum and maximum values of alpha and beta. (Block 62). The central alpha value is calculated by adding the minimum and maximum values of alpha and dividing the result by two. Similarly, the central beta value is calculated by adding the minimum and maximum values of beta and dividing the result by two. The central alpha and central beta values will lie at the center of the transformed images which cover the full field of view of the input images.

It may be desirable to test the range of alpha values and/or beta values for usability in the traditional or radial output formats. For example, if the range of alpha values is neither all positive nor all negative, the log-scaled radial stereo images cannot be output. If the range of beta values is equal or greater than 180 degrees, then the traditional stereo images can not be output. (This is done in Block 64).

It may be desirable to further restrict the minimum and maximum values of alpha and beta to a subset of the full field of view of both images. For example, the region bounded by the limits of overlapping of the two images might be used. This is done in Block 66.

Both transformed images of the QCSP have the same direction cosine matrix.

The number of pixels to be used in each output image is defined. (Block 68). The number of pixels chosen will depend on the desired horizontal and vertical output resolution.

A step value (i.e., increment) is determined for alpha and beta. (Block 70). The step value for beta is based on the number of rows in the output image and the calculated range of beta values in the output image (i.e., maximum value of beta minus minimum value of beta), so that each row of the output image has a corresponding beta value. Similarly, the step value for alpha is based on the number of columns in the output image and the calculated range of alpha values in the output image (i.e., maximum value of alpha minus minimum value of alpha), so that each column of the output image has a corresponding alpha value.

For each pair of alpha and beta values, a corresponding ray is generated in cylispheric X, Y, Z coordinates. (Block 72). The ray is then converted to global coordinates using the rotation transformation. For each ray that is generated, the intersection of the ray with each of the source images is determined. (Block 74). The pixel in each of the source images that is intersected by the ray is copied to the corresponding destination image at the alpha and beta values which were used to generate the ray.

When identifying a ray that intersects a given pixel in the source image, or when identifying a pixel that is intersected by a given ray, camera calibration data is taken into account. To generate a ray that intersects a given pixel in the source image, the input pixel is converted into a vector in a camera coordinate system. In the camera coordinate system, the X axis points out from the center of the lens, the Y axis points to the right and the Z axis points down. The X component of the vector in camera coordinates is set to 1. The Y component is defined by multiplying the normalized horizontal pixel location by a horizontal scale factor and then adding a horizontal zero point offset. Similarly, the Z component is defined by multiplying the normalized vertical pixel location by a vertical scale factor and then adding a vertical zero point offset. The scale factors and zero point offsets are based on measured camera calibration parameters. The generated vector represents a point in the image with no distortion. Radial distortion is taken into account by first calculating the radial distance of the point from the center of the image. The radial distance is calculated by squaring the Y and Z components of the generated vector, adding the squared components, and calculating the square root of the sum. The radial distance is input to a cubic polynomial distortion correction algorithm. The cubic polynomial distortion correction algorithm outputs a distortion corrected radial distance. In a preferred embodiment, the distortion corrected radial distance is calculated by cubing the input radial distance, multiplying the cubed input radial distance by a camera specific scalar distortion factor, and adding the input radial distance. The camera specific distortion factor varies from camera to camera and depends primarily on the amount of distortion produced by the camera lenses. Camera image planes tend to have relatively little distortion at the pixel level. Experience has shown that distortion corrections based on the radial distance from the optical axis are quit satisfactory. The single coefficient approach reduces the complexity and size of the data collection needed for camera calibration. The vector with no distortion is then adjusted for distortion by multiplying the Y and Z components of the vector by the ratio of the distortion corrected radial distance to the originally calculated radial distance. The distortion adjusted vector identifies the true point on the focal plane. The distortion adjusted vector is multiplied by the direction cosine matrix of the image to convert the vector from camera coordinates to global coordinates, resulting in a global ray.

Another situation in which camera calibration data is taken into account is when identifying a pixel in the source image that is intersected by a given ray. The process is essentially the reverse of that described above (i.e., the process of generating a ray that intersects a given pixel). However, there is one important difference. When starting with a pixel, a ray can always be generated that intersects that pixel. In contrast, when starting with a ray, that ray may or may not intersect a pixel. If a pixel is not intersected, an appropriate "fail" flag is set to so indicate.

A first step in identifying a pixel that is intersected by a given ray is to multiply the normalized ray by the in verse of the direction cosine matrix of the image to convert the ray from global coordinates to X, Y and Z camera coordinates. The Y and Z components of the input ray are each divided by the X component of the input ray to generate a vector that lies in the image plane and identifies the true point in the focal plane. The Y and Z components of the vector are used to calculate the radial distance of the true point from the center of the image. The radial distance is calculated by squaring the Y and Z components, adding the squared components, and calculating the square root of the sum. The radial distance and the camera specific distortion factor are input to a cubic polynomial equation solving algorithm that solves a cubic equation for one real root. Techniques for obtaining solutions to cubic equations are described in math textbooks such as Schaum's Math Handbook. The cubic polynomial equation solving algorithm outputs a distortion corrected radial distance. A normalized horizontal pixel location is calculated by multiplying the Y component of the image plane vector by the ratio of the distortion corrected radial distance and the original radial distance and then subtracting the ratio of the horizontal zero point offset and the horizontal scale factor. A normalized vertical pixel location is calculated by multiplying the Z component of the image plane vector by the ratio of the distortion corrected radial distance and the original radial distance and then subtracting the ratio of the vertical zero point offset and the vertical scale factor.

The cylispheric transform operates in three different modes. Calculation of the third and most general mode has been described above. Modes one and two adjust the horizontal pixel locations in useful ways. Mode one modifies the angles used in the direction cosine matrix and uses non-linear increments in the spacing between the horizontal lines of the output image. In the first mode, the transform generates a "traditional" stereo pair which can be viewed and interpreted using normal human perception. The first mode works well for images that are looking generally sideways to the vector between the image locations. The first mode does not work well for images aligned with (i.e., pointing in) the direction of travel, but the second mode works well for such images. In the second mode, the transform generates a "radial" stereo pair. The second mode does not work well if the images are not aligned with the direction of travel. The third mode is generally applicable to any pair of images that share a common scene. In the third mode, the transform generates a "general case cylispheric" stereo pair. The choice of the mode depends on the orientation of the input images, and the desired output characteristics. Examples of each of the types of QCSP'ss are discussed in the following paragraphs.

A. Traditional Stereo Pairs

Figure 3A:
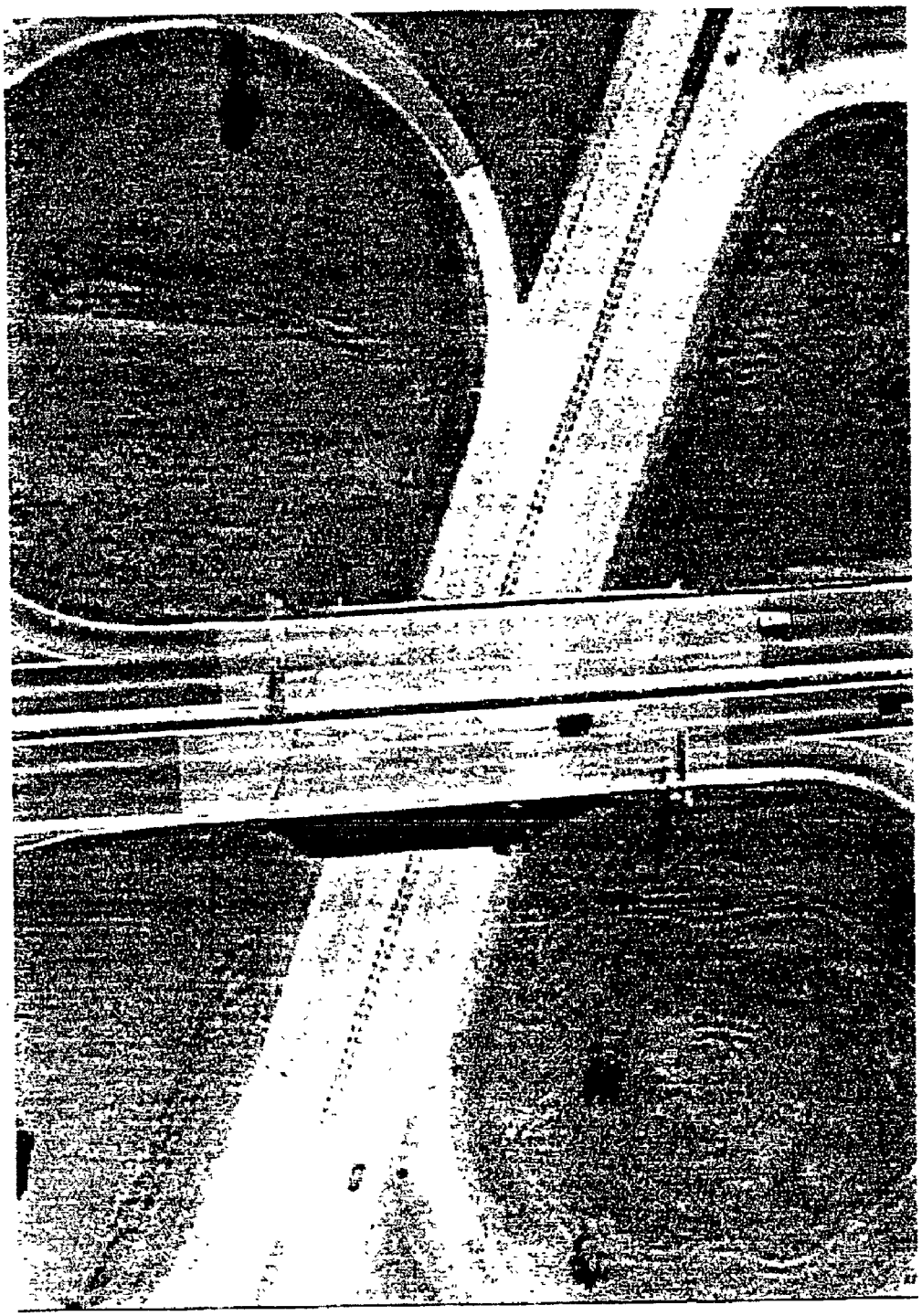
FIGS. 3A and 3B show images taken from a helicopter with a single camera looking down toward the ground and slightly forward of the helicopter.
Figure 3B:
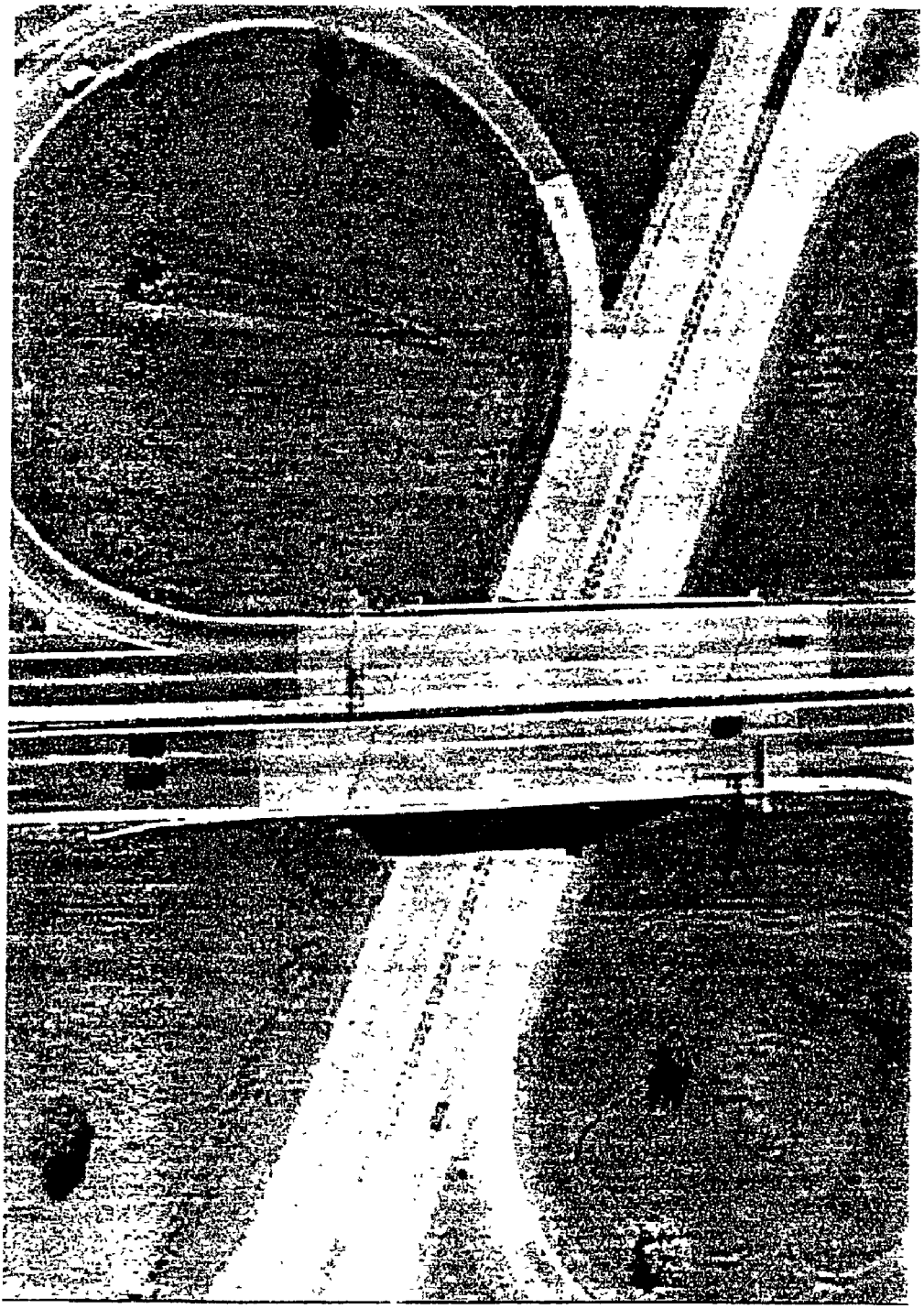
Figures 3C, 3D:
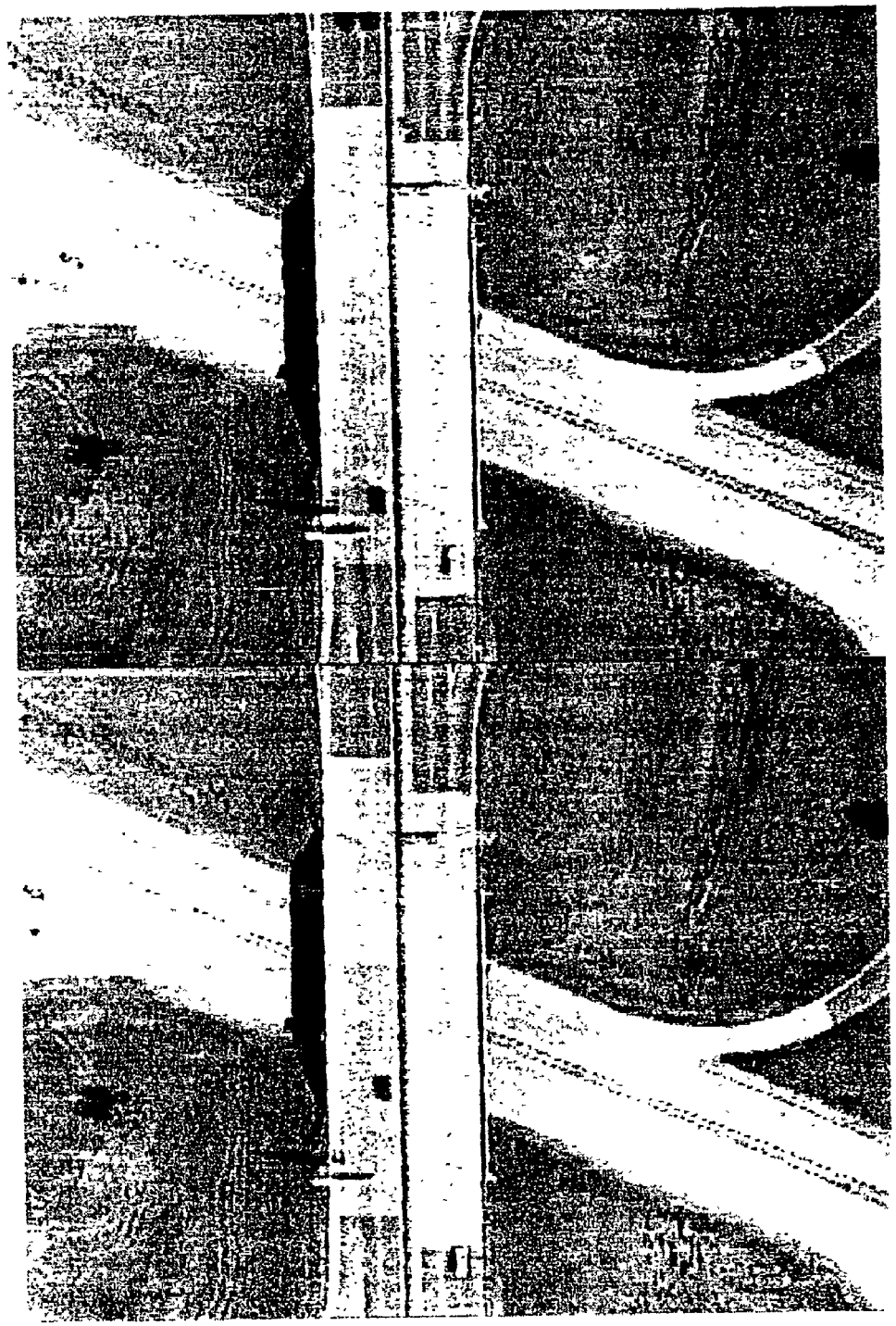
FIGS. 3C and 3D show a QCSP generated from the source images shown in FIGS. 3A and 3B which is traditional human viewable stereo pair imagery.

FIGS. 3A and 3B show images taken from a helicopter with a single camera looking down toward the ground and slightly forward of the helicopter. FIGS. 3C and 3D show a QCSP's generated from the source images shown in FIGS. 3A and 3B, respectively. The camera was bolted to the helicopter and the helicopter was yawing, pitching, and rolling along its flight path, so the image footprints of the original images were not aligned and were not stereo pairs. Because the camera was pointed slightly forward of the helicopter, the footprints of the original images were trapezoidal in shape rather than rectangular. Note that the QCSP's sub-images have been cropped to a rectangular region of overlap. Such cropping implies a particular range of interest (the range to any of the pixel pairs on the borders).

Mode One QCSP'-s are modified from the general case in the following ways:

1. Note that the choice of Beta=0 (i.e. the yaw angle) of the QCSP is somewhat flexible if not arbitrary.

2. An image coordinate frame (ICF) is rolled +90 degrees with respect to the QCSP coordinate frame. (+X is forward into the image, +Y is right, +Z is down).

3. Traditional Stereo, pairs are projected onto two coplanar planes which are perpendicular to the +X axis of the ICF.

4. For projection planes at distance x=+D in the ICF, image plane point (D,Y,Z) is related to alpha and beta by:

For −90 degree rotation of the ICF
  beta=arctangent (Z/D)
  alpha=arctangent (Y*cosine (beta)/D)
For +90 degree rotation of the ICF
  beta=arctangent (Z/D)
  alpha=arctangent (Y*cosine (beta)/D)

5. The typical trapezoidal footprint of input images, and the fact that the cameras may not be looking perpendicular to the cylindrical axis, leads to an image overlap area which is centered neither on the central axis of the source images nor on the central axis of the output image coordinates. Thus, the parameters of Mode One QCSP'-s include a two dimensional offset shift from the origin of the stereo pair coordinate frame to the center of the stored synthetic image pair. The resulting benefit is that actual image size is reduced and computer storage is saved, without loss of human viewability.

B. Radial Stereo Pairs

Figures 4A, 4B, 4C, 4D:
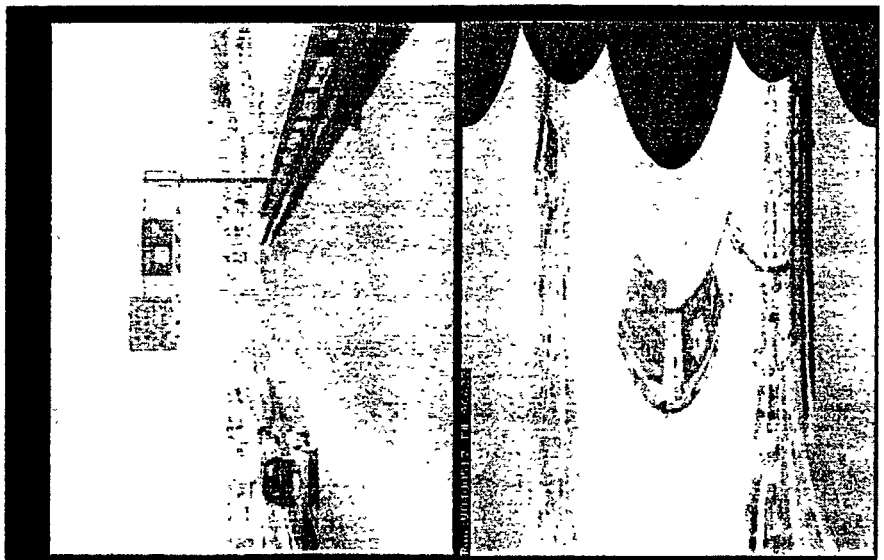
FIGS. 4A and 4B show two source images taken from a moving vehicle with a single camera pointed forward of the vehicle.
FIGS. 4C and 4D show the transformations of the two source images into an exact radial stereo pair with log scaling on the horizontal axis.

FIGS. 4A and 4B show two source images taken from a moving vehicle with a single camera pointed forward of the vehicle, and the transformations of the two source images. The source image shown in the upper left corner (FIG. 4A), is taken later in time than the source image shown in the upper right corner (FIG. 4B). The transformation of each image is shown below the source image.

A particularly clever, particularly useful choice of horizontal scaling around the direction of travel has been used. By taking the logarithm of the displacement from center (i.e the logarithm of the tangent of (90 degrees−ABS (alpha)), flat objects such as signs which are perpendicular to the direction of displacement of the cameras have the same size. Since most highway signs are approximately perpendicular to vehicle direction of travel, a broadly useful class of stereo correlation is thus simplified. This capability is demonstrated in FIGS. 4C and 4D; objects perpendicular to the direction of travel are the same size in both images, which allows less complex image recognition algorithms to be used for automatic surveying within the transformed images. For example, as shown in the transformed images of FIGS. 4C and 4D, the road sign extending over the road is the same size in both images. Note that, for alpha=0, the logarithm goes to −infinity; thus, a tiny area directly on the cylindrical axis is excluded from transformation. The excluded area may be chosen as small as a fraction of one pixel or as large as several pixels; the range information degrades in proximity to the axis of travel. Mode two and mode three synthetic stereo pairs are not familiar to human perception, but their differences from mode one stereo pairs will be transparent to automatic image correlation algorithms.

C. Cylispheric Stereo Pairs

Figures 5A, 5B, 5C, 5D:
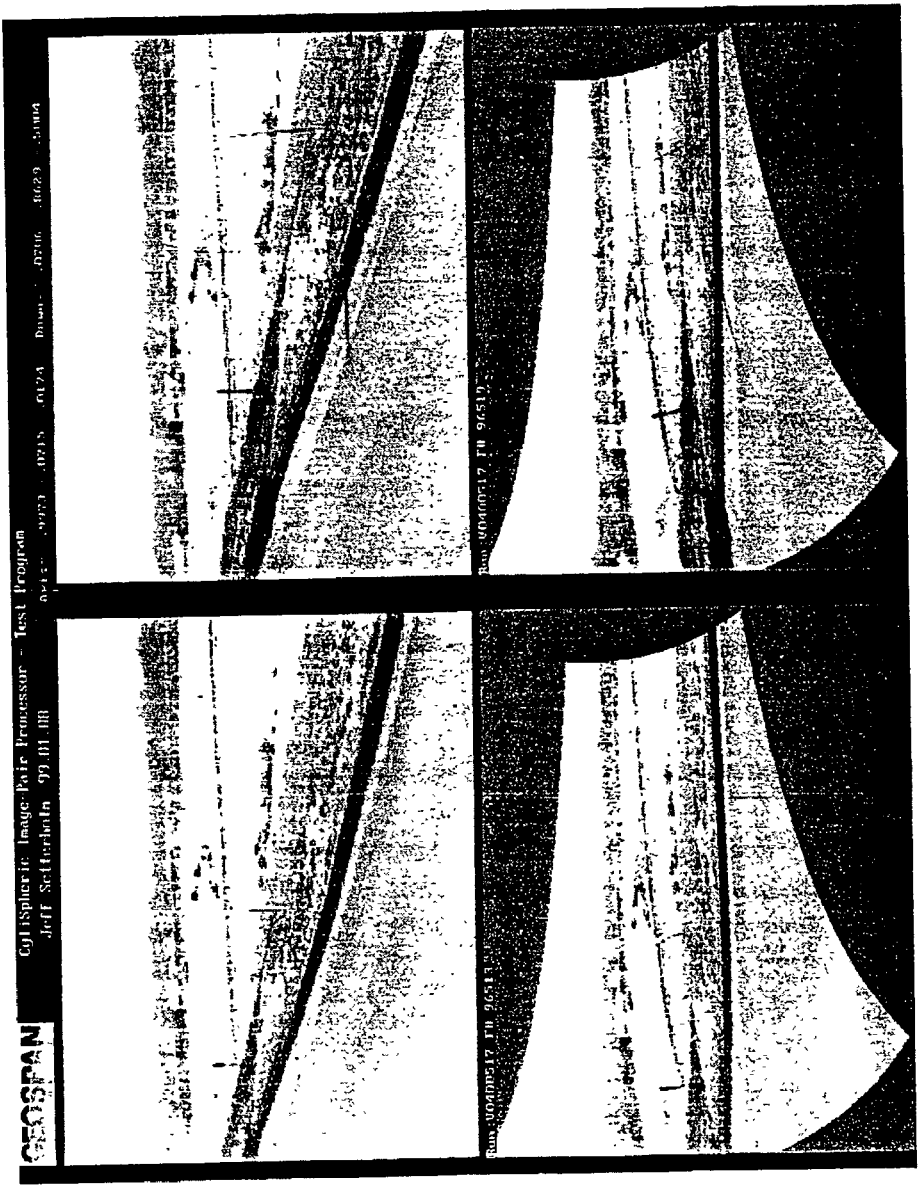
FIGS. 5A and 5B show two source images taken from a moving vehicle with a single camera pointed forward and to the right of the vehicle.
FIGS. 5C and 5D show the transformations of the two source images with cylispheric image scaling.

FIGS. 5A and 5B show two source images taken from a moving vehicle with a single camera pointed forward and to the right of the vehicle, and FIGS. 5C and 5D show the transformations of the two source images. The transformation of each image (FIGS. 5C, 5D) is shown below the source image (FIGS. 5A, 5B). The cylispheric stereo pair shown in FIGS. 5C and 5D is set up for crossed-eye viewing.

II. Correlation of QCSP's and Passive Range Determination.

After QCSP'-s have been generated, correlation algorithms operate on the stereo pairs to identify corresponding pixels between the images. It is difficult to correlate images that are far from coplanar. For example, as one moves closer to an object, the object gets bigger. As an object changes in size from image to image, the search for corresponding pixels becomes more difficult. By making the non-coplanar images into a QCSP'-s as discussed above, the search is greatly simplified. In the QCSP'-s of the present invention, corresponding pixels between images are on the same line or within a few lines of each other. This greatly increases the efficiency of the correlation process as the search for corresponding pixels is limited to a narrow linear space. Existing correlation algorithms such as those that work with traditional stereo pairs may also be used in conjunction with the QCSP'-s of the present invention. Such algorithms identify corresponding pixels by edge detection and pattern recognition, as well as other techniques.

After corresponding pixels have been identified, the range to those pixels is determined. Using the alpha and beta values associated with each pixel, two intersecting rays in cylispheric space are computed. The intersection, or point of closest approach, of the rays are the cylispheric X,Y,Z coordinates of the point. The point can then be rotated and translated into a user-defined coordinate system. Thus, a range for the pixel may be determined by triangulation. The range determination process results in X, Y, and Z cylispheric coordinates being associated with each pixel. In a preferred embodiment, ITRF earth-centered, earth-fixed (ECEF) coordinates are used for the global X, Y, and Z coordinates. When the X, Y, Z location of a pixel has been determined, the pixel becomes a volumetric entity. In a preferred embodiment, a computer automatically correlates the pixels in a QCSP's and produces a three-dimensional visualization model.

III. Data Structure for QCSP'-s

QCSP images are preferably stored as a data structure that includes sufficient parametric information to make the images useful tools for identifying the three dimensional quantitative spatial position of elements in the scene, and for enabling the insertion of virtual (including three-dimensional) objects into the scene. The insertion of virtual objects is particularly useful in mode one, so that people can "see how things will look" in the context of the existing scene, in a natural way, after a proposed change is made. The data structure of QCSP'-s allows real-time extraction and insertion of quantitative information in three-dimensions. Typically, during the synthesis of the synthetic quantitative stereo pair, the modeled distortions in the source images are removed, so that no distortion parameters are needed to describe the output image geometry.

In a preferred embodiment, the QCSP'-s are stored as standard 24 bits/pixel bitmap images (.BMP's). The QCSP'-s include a 54 byte header, followed immediately by a continuous stream of pixel data (encoded at 3 bytes per pixel—blue/green/red). Starting at the bottom left corner of each image, the pixel data is written from left-to-right for each horizontal row of the image, with the end of the row padded with zero bytes to round up to the nearest four-byte boundary. The next row above follows immediately. In the QCSP's, one or more extra lines of black pixels at the bottom of the image provide space for quantitative header data. The quantitative header data immediately follows the standard bitmap header. The quantitative header data includes numerical coefficients that are used by a set of equations that enable the precise three-dimensional geo-positioning of corresponding pixels. The coefficients are also used in the reverse transformation from three-dimensional geo-positions to pixel-pair coordinates. The last entries in the quantitative header are a test pixel pair and associated ECEF coordinates computed using the coefficients provided.

The synthetic stereo images use two right hand Euclidean coordinate systems: (1) internal to the stereo pair, and (2) external to the stereo pair. The coordinate system external to the stereo pair uses ECEF coordinates. A rotation transformation is used to go between the internal coordinate system of the stereo pair and the external ECEF coordinates.

Although the present invention has been described with reference to preferred embodiments, workers skilled in the art will recognize that changes may be made in form and detail without departing from the spirit and scope of the invention.

The invention claimed is:

1. A method of processing recorded images, the method comprising:

selecting a pair of recorded images having pixels representing an overlapping scene, each recorded image having associated with it a camera optical center and a camera orientation;

transforming the pair of recorded images into a pair of transformed images in which pixels corresponding to a common scene object point are located in corresponding horizontal lines in the pair of transformed images; and performing an image correlation using the pair of transformed images;

wherein transforming the pair of recorded images comprises:

establishing a shared spherical coordinate system having an orientation with a polar axis parallel to a line passing through the camera optical centers of the pair of recorded images; and transforming the pixels of each of the recorded images via the stored spherical coordinate system to produce the transformed images, such that for each transformed image, each row of pixels represents a line of constant longitude angle beta and each column of pixels represents a line of constant latitude angle alpha.

2. The method of claim 1 wherein each recorded image has associated data identifying a spatial position and orientation of a camera which produced the image, and wherein transforming the pair of recorded images is based upon the associated data.

3. The method of claim 2 wherein the transforming uses a geometric transformation based upon the associated data and camera calibration parameters.

4. The method of claim 1 and further comprising:
determining a range to corresponding pixels in the synthetic pair of images identified by the image correlation.

5. The method of claim 4 and further comprising:
determining a global location for each pixel based upon the range.

6. The method of claim 1 and further comprising:
producing a three-dimensional visualization model based upon the image correlation.

7. The method of claim 1 wherein transforming the pixels comprises:
defining a transformation between a global coordinate system and the shared spherical coordinate system;
generating first and second sets of rays in the shared spherical coordinate system which define pixels of the transformed images;
converting the first and second sets of rays to individual camera coordinate systems; and
populating the transformed images with pixels of the recorded images which are intersected by the first and second sets of rays in the individual camera coordinate systems.

8. The method of claim 7 wherein each ray is defined by shared spherical coordinates and by angles alpha and beta, where alpha is an angle of the ray with respect to the polar axis and beta is an angle of a plane defined by the ray and the polar axis with respect to a reference plane through the polar axis.

9. A method of processing image data, the method comprising:
storing first image data and first camera location data;
storing second image data and second camera location data;
geometrically transforming the first image data and the second image data based upon the first camera location data and the second camera location data to produce first transformed image data and second transformed image data; and
performing an image correlation using the first and second transformed image data;
wherein geometrically transforming comprises:
defining a polar axis of a shared spherical coordinate system based upon the first camera location and the second camera location;
defining a rotation transformation matrix based upon the polar axis and the shared spherical coordinate system;
generating first and second sets of rays which define pixels of the first and second transformed image data, respectively;
transforming the first and second sets of rays into a coordinate system related to the first and second image data; and
forming the first and second transformed image data based upon pixels in the first and second image data intersected by the first and second sets of rays.

10. The method of claim 9 wherein the first sphere is centered on the first camera location.

11. The method of claim 10 wherein the second sphere is centered on the second camera location.

12. The method of claim 9 wherein each ray is defined by angles alpha and beta, wherein alpha is an angle of the ray with respect to the polar axis and beta is an angle of a plane defined by the ray and the polar axis with respect to a reference plane through the polar axis.

13. The method of claim 9 and further comprising:
determining a range to corresponding pixels in the first and second transformed image data identified by the image correlation.

14. The method of claim 13 and further comprising:
determining a global location for each pixel based upon the range.

15. The method of claim 9 and further comprising:
producing a three-dimensional visualization model based upon the image correlation.

16. The method of claim 9 wherein geometrically transforming comprises:
defining a cylindrical axis between a first camera location associated with the first image and a second camera location associated with the second image;
locating selected pixels in each recorded image using a coordinate system based upon the cylindrical axis; and
creating the first and second transformed image data geometrically using the selected pixels.

17. A method of processing recorded images, the method comprising:
selecting first and second recorded images having an overlapping scene;
defining a shared spherical coordinate system having a polar axis parallel to a line between first and second camera locations associated with the first and second recorded images;
generating first and second sets of rays which originate from the first and second camera locations, respectively, each ray being defined by angles $\alpha$ and $\beta$, where $\alpha$ is a latitude angle of the ray with respect to the polar axis and where $\beta$ is a longitude angle of a plane defined by the ray and the polar axis with respect to a reference plane through the polar axis;
defining a transformation between a global coordinate system related to the first and second recorded images and the shared spherical coordinate system;
converting the first and second set of rays from the shared spherical coordinate system to individual camera coordinate systems;
populating a first transformed image with pixels of the first recorded image intersected by the first set of rays;
populating a second transformed image with pixels of the second recorded image intersected by the second set of rays; and
wherein for each of the first and second transformed images, each row of pixels represents a line of constant longitude angle $\beta$ and each column of pixels represents a line of constant latitude angle $\alpha$.

18. The method of claim 17, and further comprising:
performing an image correlation using the first and second transformed images.

19. The method of claim 18, and further comprising:
using the image correlation to determine a location of corresponding pixels in the first and second transformed images.

20. The method of claim 17, and further comprising:
producing a three-dimensional model using the first and second transformed images.

21. The method of claim 17, and further comprising;
determining ray direction increments for rays of the first and second sets of rays.

22. The method of claim 21, wherein the ray direction increments are based upon an arctangent of constant distance increments.

23. The method of claim 21, wherein the ray direction increments are based upon a logarithm of the tangent of $\alpha$.

24. The method of claim 21, wherein the ray direction increments a constant angular increments.

* * * * *

UNITED STATES PATENT AND TRADEMARK OFFICE
CERTIFICATE OF CORRECTION

PATENT NO. : 7,233,691 B2
APPLICATION NO. : 10/168811
DATED : June 19, 2007
INVENTOR(S) : Jeffrey M. Setterholm It is certified that error appears in the above-identified patent and that said Letters Patent is hereby corrected as shown below:

Column 11, Line 6, deleted "stored", insert --shared--

Signed and Sealed this

Twenty-third Day of October, 2007

JON W. DUDAS
*Director of the United States Patent and Trademark Office*